US012626636B2

(12) United States Patent
Sugihara

(10) Patent No.: US 12,626,636 B2
(45) Date of Patent: May 12, 2026

(54) LOW VOLTAGE DIFFERENTIAL SIGNALING (LVDS) COMMUNICATION INTERFACE CONNECTING LIQUID CRYSTAL CONTROLLER AND LIQUID CRYSTAL DRIVER

(71) Applicant: LAPIS Technology Co., Ltd., Yokohama (JP)

(72) Inventor: Kouya Sugihara, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/784,886

(22) Filed: Jul. 25, 2024

(65) Prior Publication Data

US 2025/0037639 A1 Jan. 30, 2025

(30) Foreign Application Priority Data

Jul. 28, 2023 (JP) ................................ 2023-123355

(51) Int. Cl.
*G09G 3/36* (2006.01)
*G09G 3/20* (2006.01)

(52) U.S. Cl.
CPC ......... *G09G 3/2096* (2013.01); *G09G 3/3696* (2013.01); *G09G 2310/0272* (2013.01); *G09G 2310/08* (2013.01)

(58) Field of Classification Search
CPC ...... G09G 3/2096; G09G 3/36; G09G 3/3611; G09G 3/3614; G09G 3/3622; G09G 3/3625; G09G 3/364; G09G 3/3644; G09G 3/3648; G09G 3/3674; G09G 3/3677; G09G 3/3681; G09G 3/3685; G09G 3/3692; G09G 3/3696; G09G 2310/0272
USPC .................................................... 345/87–104
See application file for complete search history.

(56) References Cited

U.S. PATENT DOCUMENTS

| | | | | |
|---|---|---|---|---|
| 9,698,735 | B1 * | 7/2017 | McCue ............... | H03F 3/45085 |
| 2003/0117353 | A1 * | 6/2003 | Moon .................. | G09G 3/3655 345/87 |
| 2004/0123197 | A1 * | 6/2004 | Sunter ................ | G01R 31/2834 714/724 |

(Continued)

FOREIGN PATENT DOCUMENTS

| | | |
|---|---|---|
| JP | 2001503182 | 3/2001 |

*Primary Examiner* — Ke Xiao
*Assistant Examiner* — Nelson Lam
(74) *Attorney, Agent, or Firm* — JCIPRNET

(57) ABSTRACT

A circuit includes: a receiving circuit, having a first input terminal for inputting a first signal transmitted via a first capacitive element, and a second input terminal for inputting a second signal transmitted via a second capacitive element and having a potential that changes complementarily to the first signal, and outputting a first logic signal corresponding to a potential of the first signal and a second logic signal corresponding to a potential of the second signal; and a signal supply circuit, supplying a first guarantee signal having a potential corresponding to a value of the first logic signal to the first input terminal as a signal for guaranteeing a potential of the first signal, and supplying a second guarantee signal having a potential that changes complementarily to the first guarantee signal to the second input terminal as a signal for guaranteeing a potential of the second signal.

6 Claims, 8 Drawing Sheets

(56) References Cited

U.S. PATENT DOCUMENTS

| | | | | |
|---|---|---|---|---|
| 2004/0208265 | A1* | 10/2004 | Kuijk | H04L 25/0292<br>375/257 |
| 2008/0191784 | A1* | 8/2008 | Khoury | H03K 19/01707<br>327/536 |
| 2011/0157120 | A1* | 6/2011 | Hasegawa | G09G 3/3688<br>345/96 |
| 2015/0054559 | A1* | 2/2015 | Jeffries | H04L 7/0008<br>327/307 |
| 2015/0145801 | A1* | 5/2015 | Angelini | G06F 3/0446<br>345/174 |
| 2015/0277660 | A1* | 10/2015 | Yang | G06F 3/0446<br>345/173 |
| 2015/0319020 | A1* | 11/2015 | Song | H04L 25/0272<br>345/204 |
| 2022/0004273 | A1* | 1/2022 | Yu | G06F 3/044 |
| 2024/0146304 | A1* | 5/2024 | Nguyen | H04L 25/0298 |

* cited by examiner

| State | S1 | S2 | SW1 | SW2 | SW3 | SW4 | Q1 | Q2 |
|---|---|---|---|---|---|---|---|---|
| 1 | H | L | ON | OFF | OFF | ON | VH | VL |
| 2 | L | H | OFF | ON | ON | OFF | VL | VH |

FIG. 4

LOW VOLTAGE DIFFERENTIAL SIGNALING (LVDS) COMMUNICATION INTERFACE CONNECTING LIQUID CRYSTAL CONTROLLER AND LIQUID CRYSTAL DRIVER

CROSS-REFERENCE TO RELATED APPLICATION

This application claims priority under 35 USC 119 from Japanese Patent application No. 2023-123355 filed on Jul. 28, 2023, the disclosure of which is incorporated by reference herein.

TECHNICAL FIELD

The present disclosure relates to a circuit and a communication system.

RELATED ART

Patent Document 1 (Japanese translation of PCT international application No. 2001-503182) discloses a receiving circuit for receiving data using a differential signal, which is a balanced signal transmitted by an alternating current (AC) coupling method (see FIG. 4 of Patent Document 1).

In the alternating current coupling method, a capacity element that removes a DC signal is placed in the transmission path. For this reason, while the data input to the receiving circuit continues to change, the capacity element is repeatedly charged and discharged, and the potentials of the two signals included in the differential signal, which change in a complementary manner, change to H level or L level. Thus, the receiving circuit may operate normally according to the differential signal.

However, when the input data does not change for a certain period of time, the energy stored in the capacity element continues to be discharged, and the potentials of the two signals may become approximately the same level. Thus, the receiving circuit is unable to detect the potential of the differential signal and may malfunction. For this reason, the conventional technology has room for improvement in terms of realizing stable operation of the receiving circuit.

The disclosure provides a circuit capable of realizing stable operation.

SUMMARY

The circuit according to the disclosure is an alternating current coupling circuit, including: a receiving circuit, having a first input terminal for inputting a first signal transmitted via a first capacitive element, and a second input terminal for inputting a second signal transmitted via a second capacitive element and having a potential that changes complementarily to the first signal, and outputting a first logic signal corresponding to a potential of the first signal and a second logic signal corresponding to a potential of the second signal; and a signal supply circuit, supplying a first guarantee signal having a potential corresponding to a value of the first logic signal to the first input terminal as a signal for guaranteeing a potential of the first signal, and supplying a second guarantee signal having a potential that changes complementarily to the first guarantee signal to the second input terminal as a signal for guaranteeing a potential of the second signal.

The communication system according to the disclosure includes a first semiconductor device, having a transmitting circuit for transmitting a first signal and a second signal; and a second semiconductor device having the above-mentioned circuit, wherein the first signal is supplied to the circuit via the first capacitive element, and the second signal is supplied to the circuit via the second capacitive element.

BRIEF DESCRIPTION OF DRAWINGS

FIG. 4 is a diagram for illustrating the operation of the circuit.

DESCRIPTION OF EMBODIMENTS

According to the disclosure, a circuit that is capable of achieving stable operation may be provided.

The embodiment is described below with reference to the drawings. In addition, the same or similar symbols are used for the same functions and configurations, and descriptions therefor are omitted as appropriate.

Embodiment (Display Device)

Figure 1:
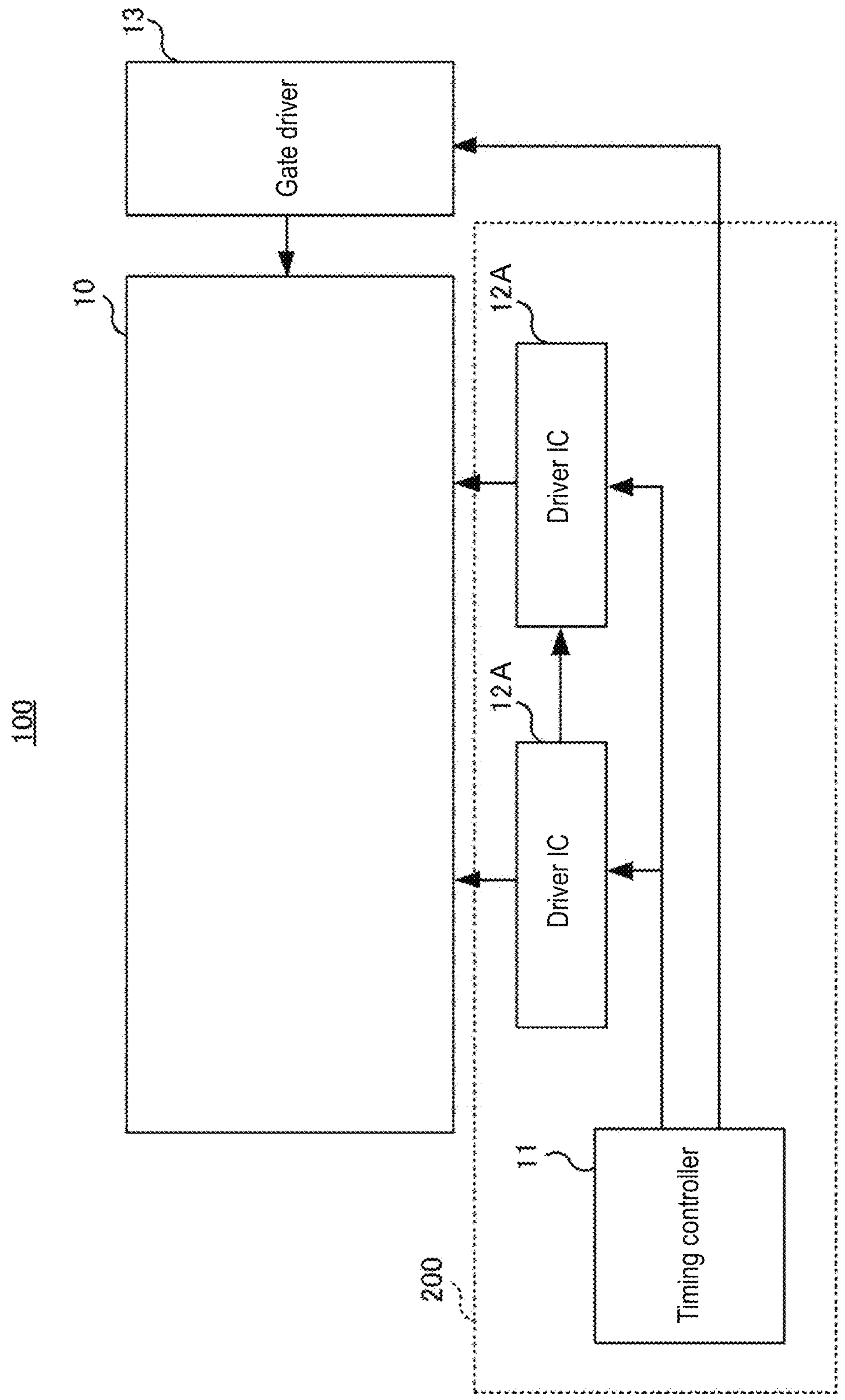
FIG. 1 is a diagram showing the configuration of the display device according to the embodiment of the disclosure.

FIG. 1 is a diagram showing the configuration of the display device according to the embodiment of the disclosure. The display device 100 may be interpreted as a display device for a vehicle that is mounted on an automobile or the like. The display device 100 includes a display panel 10, a timing controller 11, driver integrated circuits (IC) 12, and a gate driver 13.

The display panel 10 may be interpreted as an image display device such as an LCD display panel or an organic electro luminescence (EL) panel. The timing controller 11 may control the display timing of an image on the display panel 10 by controlling a plurality of driver ICs 12A and the gate driver 13. The timing controller 11 may generate a clock signal and supply the same to the driver ICs 12A. The timing controller 11 may supply a scan control signal synchronized with the video data to the gate driver 13.

The driver IC 12A may be interpreted as a semiconductor device having a receiving circuit, which is described later. The driver ICs 12A control the lighting state of a plurality of light-emitting elements provided on the display panel 10.

The gate driver 13 may generate a gate signal based on the signal supplied from the timing controller 11 and supply the gate signal to the display panel 10.

The timing controller 11 and the driver ICs 12A may constitute a communication system 200. The communication system 200 may interpret a system that applies mini-LVDS (low voltage differential signaling). Mini-LVDS may be interpreted as an interface standard for connecting a liquid crystal controller and a liquid crystal driver.

Figure 2:
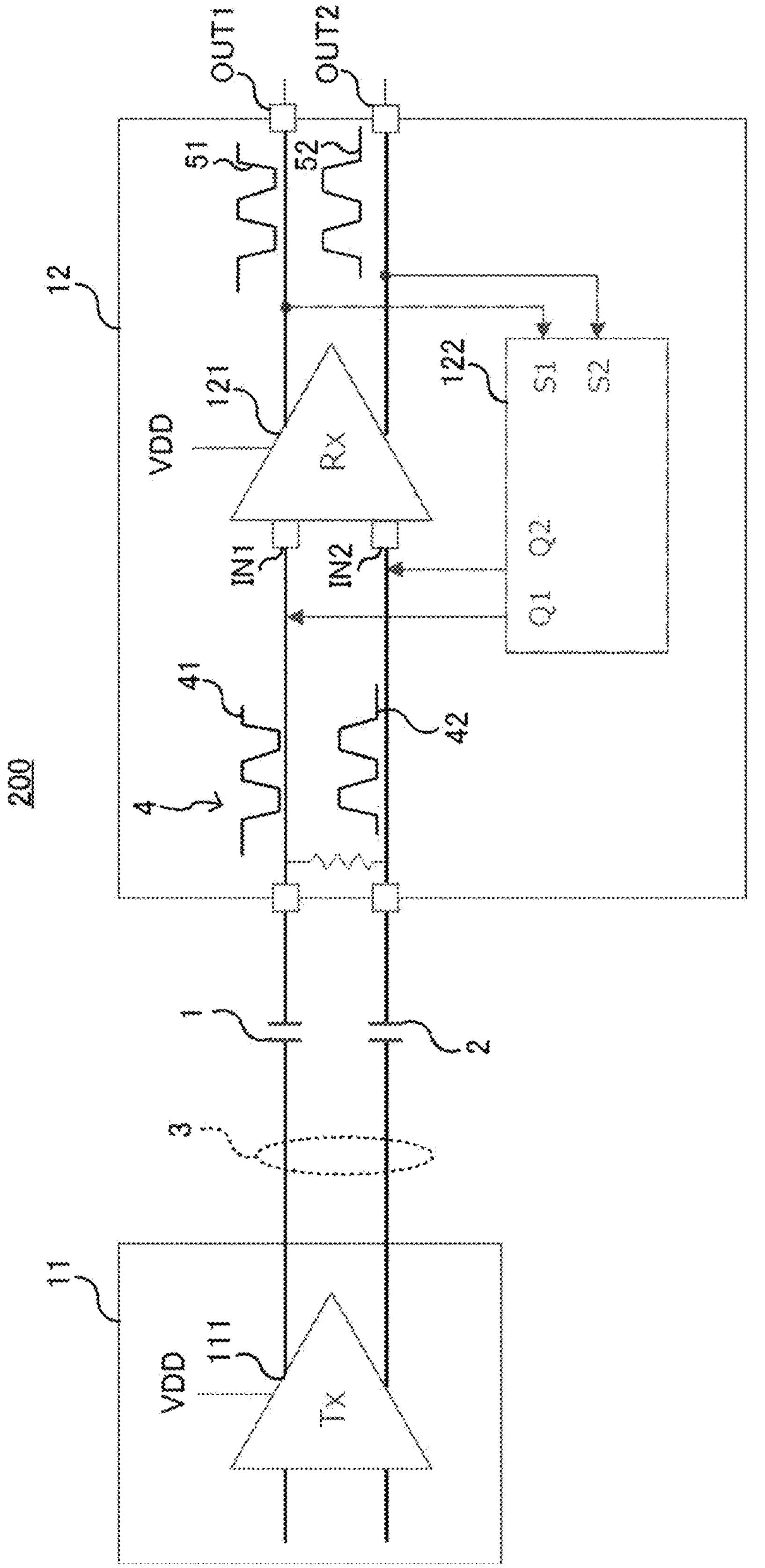
FIG. 2 is a diagram showing the configuration of the communication system according to the embodiment of the disclosure.

Next, a specific configuration of the communication system 200 is described with reference to FIG. 2. FIG. 2 is a diagram showing the configuration of the communication system according to the embodiment of the disclosure. The communication system 200 includes a timing controller 11 and a signal output circuit 12. The timing controller 11 and the signal output circuit 12 are communicatively connected via a transmission path 3.

The timing controller 11 includes a transmitting circuit 111. The transmitting circuit 111 may be interpreted as a circuit that transmits data using a differential signal 4. The differential signal 4 includes two signals that change in a complementary manner to each other. Specifically, the differential signal 4 includes a first signal 41 transmitted via a first capacitive element 1 provided in the transmission path 3 and a second signal 42 transmitted via a second capacitive element 2 provided in the transmission path 3. The second signal 42 may be interpreted as a signal whose potential changes complementarily to the first signal 41.

The signal output circuit 12 includes a receiving circuit 121 and a signal supply circuit 122.

The receiving circuit 121 may be interpreted as an alternating current coupling data receiving circuit that is supplied with a differential signal 4 transmitted via a capacity element. The alternating current coupling method may be interpreted as a method of removing the direct current component of the input signal and transmitting only the alternating current component to the receiving circuit 121. The receiving circuit 121 has a first input terminal IN1 that inputs the first signal 41 and a second input terminal IN2 that inputs the second signal 42.

The receiving circuit 121 outputs a first logic signal 51 corresponding to the potential of the first signal 41 and a second logic signal 52 corresponding to the potential of the second signal 42. Specifically, the first signal 41 and the second signal 42 are amplified, and the first logic signal 51 and the second logic signal 52 having voltage levels higher than the first signal 41 and the second signal 42 are output.

The first logic signal 51 is transmitted to the display panel 10 shown in FIG. 1 via a first output terminal OUT1, and is also input to a first input terminal S1 of the signal supply circuit 122.

The second logic signal 52 is transmitted to the display panel 10 shown in FIG. 1 via a second output terminal OUT2, and is also input to a second input terminal S2 of the signal supply circuit 122.

The signal supply circuit 122 may be interpreted as a circuit for guaranteeing the potential of the first signal 41 and the potential of the second signal 42. The signal supply circuit 122 includes a first input terminal S1 that inputs the first logic signal 51, a second input terminal S2 that inputs the second logic signal 52, a first output terminal Q1 that outputs a first guarantee signal, and a second output terminal Q2 that outputs a second guarantee signal.

The signal supply circuit 122 may supply a first guarantee signal having a potential corresponding to a value of the first logic signal 51 to the first input terminal IN1 of the receiving circuit 121 via the first output terminal Q1 as a signal for guaranteeing a potential of the first signal 41. Further, the signal supply circuit 122 may supply a second guarantee signal having a potential that changes complementarily to the first guarantee signal to the second input terminal IN2 of the receiving circuit 121 via the second output terminal Q2 as a signal for guaranteeing a potential of the second signal 42.

Figure 3:
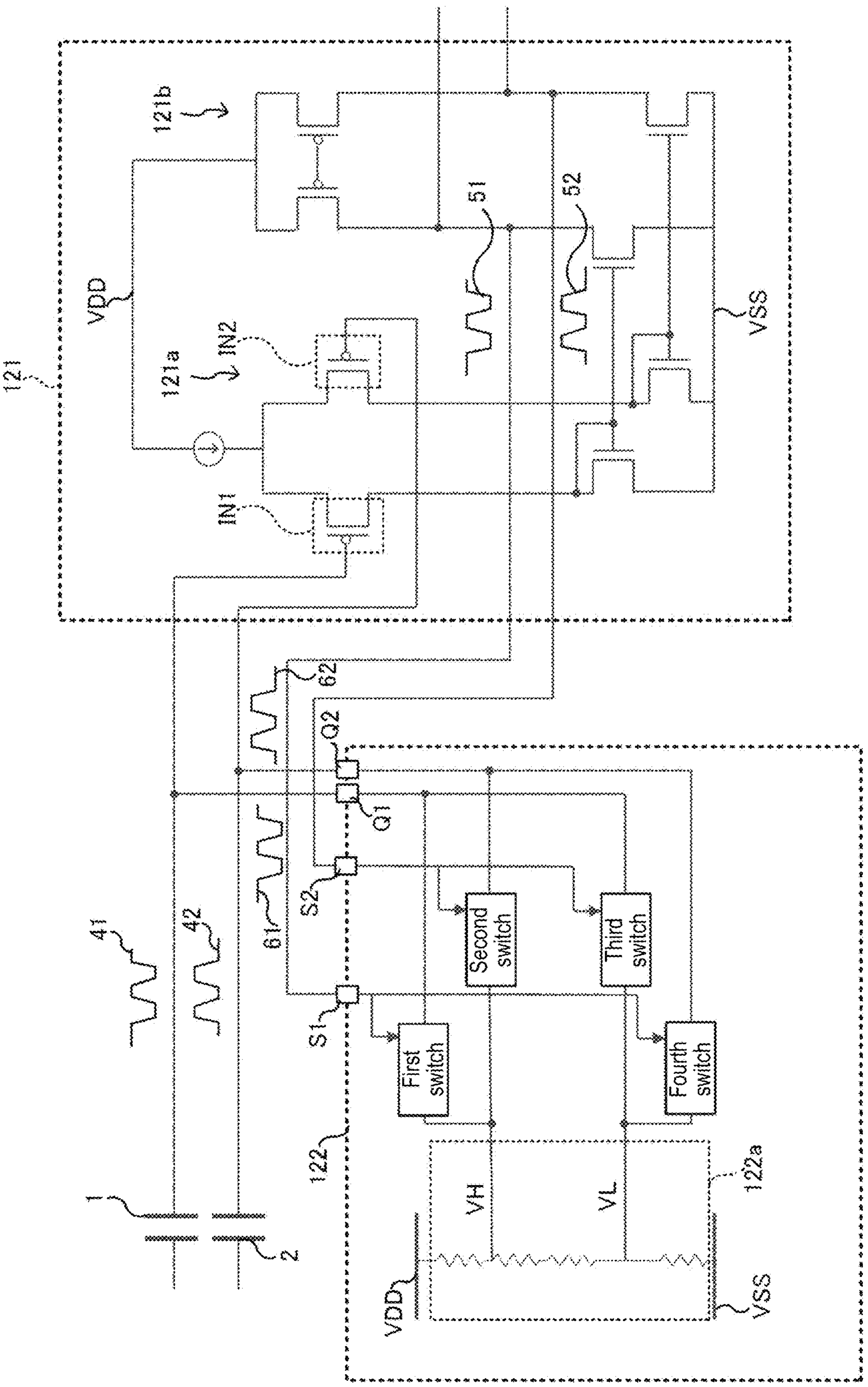
FIG. 3 is a diagram showing the configuration of the circuit according to the embodiment of the disclosure.

Next, the specific configuration of the signal output circuit 12 is described with reference to FIG. 3. FIG. 3 is a diagram showing the configuration of the circuit according to the embodiment of the disclosure.

As shown in FIG. 3, the receiving circuit 121 includes a first differential amplifier circuit 121*a* and a second differential amplifier circuit 121*b*.

The first signal 41 is input to the first differential amplifier circuit 121*a* via the first input terminal IN1, and the second signal 42 is input to the first differential amplifier circuit 121*a* via the second input terminal IN2. The output of the first differential amplifier circuit 121*a* is input to the second differential amplifier circuit 121*b*. The second differential amplifier circuit 121*b* amplifies the input signals and outputs the same as the first logic signal 51 and the second logic signal 52.

When the first guarantee signal 61 of a first potential VH is supplied to the first input terminal IN1 of the receiving circuit 121, the signal supply circuit 122 supply the second guarantee signal 62 of a second potential VL lower than the first potential VH to the second input terminal IN2 of the receiving circuit 121. When the first guarantee signal 61 of the second potential VL is supplied to the first input terminal IN1 of the receiving circuit 121, the signal supply circuit 122 supply the second guarantee signal 62 of the first potential VH to the second input terminal IN2 of the receiving circuit 121. The first potential VH and the second potential VL may be interpreted as a reference voltage with a restricted current supply capability.

Specifically, the signal supply circuit 122 includes a voltage divider circuit 122*a* and a plurality of switches. The plurality of switches include a first switch 122*b*1, a second switch 122*b*2, a third switch 122*b*3, and a fourth switch 122*b*4.

The voltage divider circuit 122*a* may be interpreted as a circuit that generates the first potential VH or the second potential VL by dividing a voltage applied to a resistor provided between two power sources (VDD, VSS). By using the voltage divider circuit 122*a*, the first potential VH or the second potential VL may be generated with a simple configuration by using a power source common to the two power sources (VDD, VSS) supplied to the receiving circuit 121.

It is noted that the signal supply circuit 122 may include a power source that outputs the first potential VH or the second potential VL, instead of the voltage divider circuit 122*a* including a resistor.

When a value of the first logic signal 51 is a specific potential, the first switch 122*b*1 is turned on so as to supply the first guarantee signal 61 of the first potential VH to the first input terminal IN1. Specifically, when the value of the first logic signal 51 applied to the first input terminal S1 is at H level, the first switch 122*b*1 is turned on so as to supply the first guarantee signal 61 of the first potential VH to the first input terminal IN1 of the receiving circuit 121 via the first output terminal Q1.

When the value of the first logic signal 51 applied to the first input terminal S1 is at L level, the first switch 122*b*1 is turned off. In this way, the output of the first guarantee signal 61 of the first potential VH is stopped.

When a value of the second logic signal 52 is a specific potential, the second switch 122*b*2 is turned on so as to supply the second guarantee signal 62 of the first potential VH to the second input terminal IN2. Specifically, when the value of the second logic signal 52 applied to the second input terminal S2 is at H level, the second switch 122*b*2 is turned on so as to supply the second guarantee signal 62 of the first potential VH to the second input terminal IN2 of the receiving circuit 121 via the second output terminal Q2.

When the value of the second logic signal 52 applied to the second input terminal S2 is at L level, the second switch **122*b*2 is turned off. In this way, the output of the second guarantee signal 62** of the first potential VH is stopped.

When a value of the second logic signal 52 is a specific potential, the third switch **122*b*3 is turned on so as to supply the first guarantee signal 61 of the second potential VL to the first input terminal IN1. Specifically, when the value of the second logic signal 52 applied to the second input terminal S2 is at H level, the third switch 122*b*3 is turned on so as to supply the first guarantee signal 61 of the second potential VL to the first input terminal IN1 of the receiving circuit 121** via the first output terminal Q1.

When the value of the second logic signal 52 applied to the second input terminal S2 is at L level, the third switch **122*b*3 is turned off. In this way, the output of the second guarantee signal 62** of the second potential VL is stopped.

When a value of the first logic signal 51 is a specific potential, the fourth switch **122*b*4 is turned on so as to supply the second guarantee signal 62 of the second potential VL to the second input terminal IN2. Specifically, when the value of the first logic signal 51 applied to the first input terminal S1 is at H level, the fourth switch 122*b*4 is turned on so as to supply the second guarantee signal 62 of the second potential VL to the second input terminal IN2 of the receiving circuit 121** via the second output terminal Q2.

When the value of the first logic signal 51 applied to the first input terminal S1 is at L level, the fourth switch **122*b*4 is turned off. In this way, the output of the second guarantee signal 62** of the second potential VL is stopped.

(Operation of Circuit)

Next, the operation of the signal output circuit 12 is described with reference to FIG. 4, FIG. 5, and FIG. 6. FIG. 4 is a diagram for illustrating the operation of the circuit.

State "1" shown in FIG. 4 represents the following states.

(1) The value of the first logic signal 51 applied to the first input terminal S1 is at H level.
(2) The value of the second logic signal 52 applied to the second input terminal S2 is at L level.
(3) The first switch **122*b*1** is turned on.
(4) The second switch **122*b*2** is turned off.
(5) The third switch **122*b*3** is turned off.
(6) The fourth switch **122*b*4** is turned on.
(7) The potential applied to the first output terminal Q1 is the first potential VH.
(8) The potential applied to the second output terminal Q2 is the second potential VL.

State "2" shown in FIG. 4 represents the following states.

(1) The value of the first logic signal 51 applied to the first input terminal S1 is at L level.
(2) The value of the second logic signal 52 applied to the second input terminal S2 is at H level.
(3) The first switch **122*b*1** is turned off.
(4) The second switch **122*b*2** is turned on.
(5) The third switch **122*b*3** is turned on.
(6) The fourth switch **122*b*4** is turned off.
(7) The potential applied to the first output terminal Q1 is the second potential VL.
(8) The potential applied to the second output terminal Q2 is the first potential VH.

Figure 5:
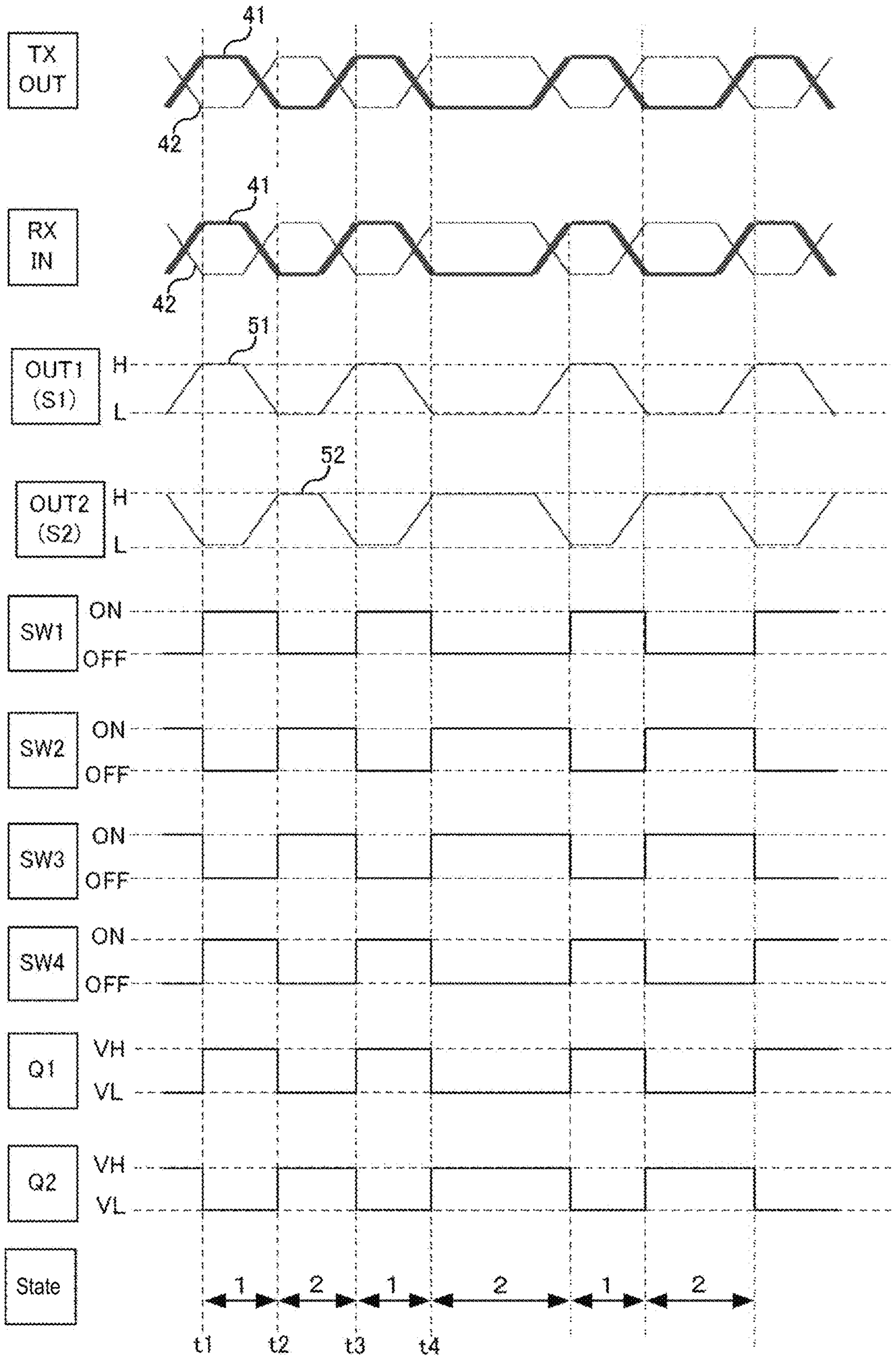
FIG. 5 is a timing chart for illustrating the operation of the circuit.
Figure 6:
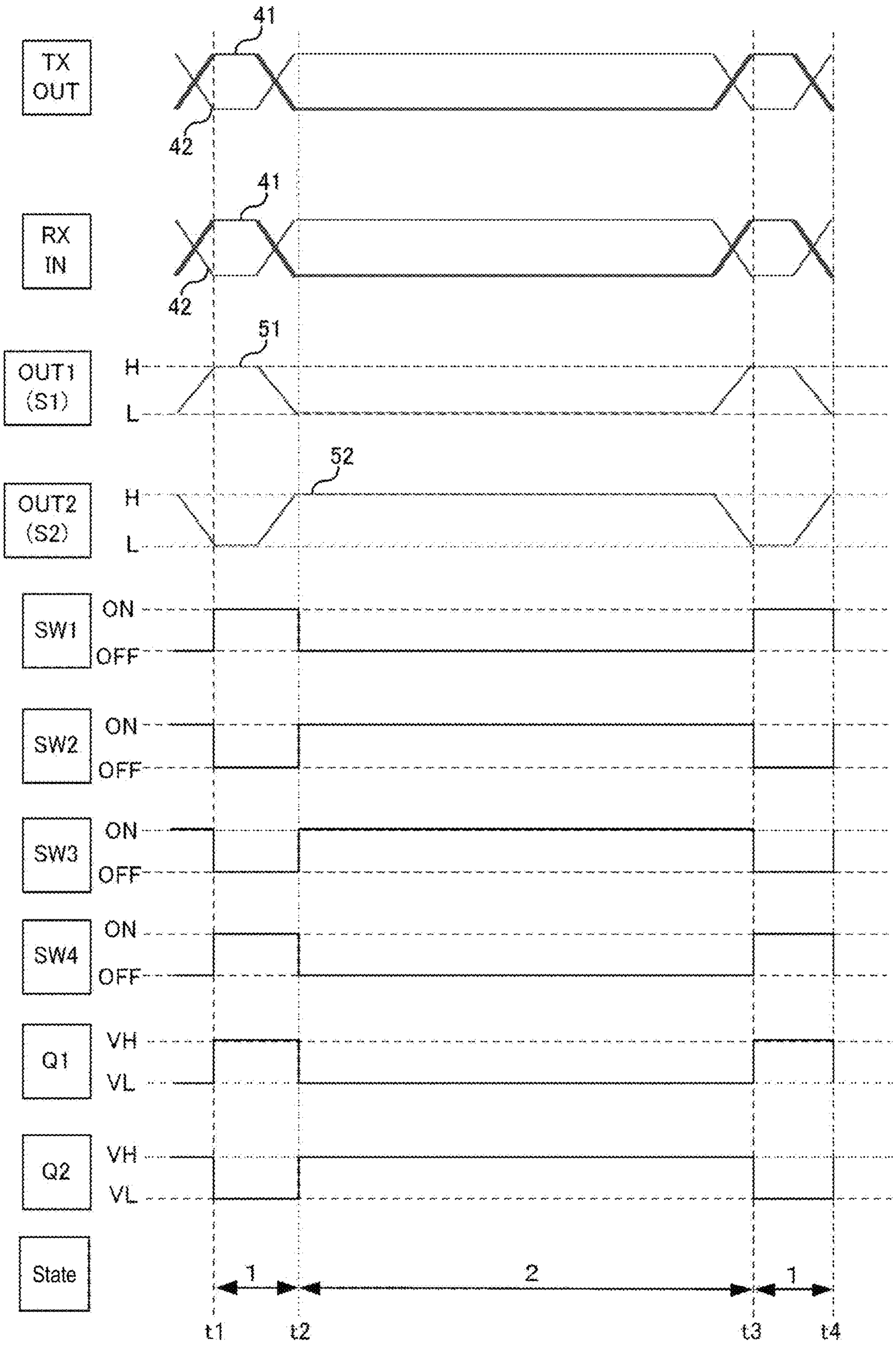
FIG. 6 is a timing chart for illustrating the operation of the circuit.

FIG. 5 and FIG. 6 are timing charts for illustrating the operation of the circuit. FIG. 5 shows the first logic signal 51, the second logic signal 52, and the like when data input to the receiving circuit 121, that is, output data of the transmitting circuit 111, continues to change. FIG. 6 shows the first logic signal 51, the second logic signal 52, and the like when the output data does not change for a certain period of time.

The first signal 41 input to the first input terminal IN1 and the first logic signal 51 output from the first output terminal OUT1 are in phase. The second signal 42 input to the second input terminal IN2 and the second logic signal 52 output from the second output terminal OUT2 are in phase. The first signal 41 and the second signal 42 are in opposite phase.

In FIG. 5 and FIG. 6, the following signals are shown in order from the top.

(1) The voltage levels of the first signal 41 and the second signal 42, which are data output from the transmitting circuit 111.
(2) The voltage levels of the first signal 41 and the second signal 42, which are data input to the receiving circuit 121.
(3) The voltage level of the first logic signal 51, which is the data output from first output terminal OUT1.
(4) The voltage level of second logic signal 52, which is the data output from second output terminal OUT2.
(5) The state of the first switch **122*b*1**.
(6) The state of the second switch **122*b*2**.
(7) The state of the third switch **122*b*3**.
(8) The state of the fourth switch **122*b*4**.
(9) The voltage level of the first output terminal Q1.
(10) The voltage level of the second output terminal Q2.
(11) A number corresponding to the "state" shown in FIG. 4.

(In Case the Output Data Continues to Change)

As shown in FIG. 5, when the first signal 41 is at H level and the second signal 42 is at L level from timing t1 to timing t2, the first logic signal 51 is at H level, the second logic signal 52 is at L level, the first switch **122*b*1 is turned on, and the second switch 122*b*2 is turned off. In addition, the third switch 122*b*3 is turned off and the fourth switch 122*b*4 is turned on. As a result, the first potential VH from the voltage divider circuit 122*a* is input to the first input terminal IN1 via the first output terminal Q1. Further, the second potential VL from the voltage divider circuit 122*a*** is input to the second input terminal IN2 via the second output terminal Q2.

When the first signal 41 is at L level and the second signal 42 is at H level from timing t2 to timing t3, the first logic signal 51 is at L level, the second logic signal 52 is at H level, the first switch **122*b*1 is turned off, and the second switch 122*b*2 is turned on. In addition, the third switch 122*b*3 is turned on and the fourth switch 122*b*4 is turned off. As a result, the second potential VL from the voltage divider circuit 122*a* is input to the first input terminal IN1 via the first output terminal Q1. Further, the first potential VH from the voltage divider circuit 122*a*** is input to the second input terminal IN2 via the second output terminal Q2.

When the first signal 41 changes to H level and the second signal 42 changes to L level at timing t3, during the period from timing t3 to timing t4, similarly to the period from timing t1 to timing t2, the first potential VH is input to the first input terminal IN1, and the second potential VL is input to the second input terminal IN2.

(In Case the Output Data does not Change for a Certain Period of Time)

In the period from timing t2 to timing t3 in FIG. 6, the output data does not change for a certain period of time. Even when the output data does not change in this way, when the first signal 41 goes to the L level and the second signal 42 goes to the H level at timing t2, the first logic signal 51 goes to the L level and the second logic signal 52 goes to the H level. As a result, the first switch **122*b*1 is turned off and the second switch 122*b*2 is turned on. In addition, the third switch 122*b*3 is turned on and the fourth switch 122*b*4** is turned off.

Thus, the second potential VL is input to the first input terminal IN1 via the first output terminal Q1. Further, the first potential VH is input to the second input terminal IN2 via the second output terminal Q2. Then, the first potential VH and the second potential VL continue to be output until timing t3. Specifically, the potential of the first signal 41 transmitted via the first capacitive element 1 and the potential of the second signal 42 transmitted via the second capacitive element 2 are guaranteed until timing t3. More specifically, since the input data does not change for a certain period of time, the energy stored in the capacity element continues to be discharged, so that even in a situation where the potentials of the first signal 41 and the second signal 42 input to the receiving circuit 121 may decrease, by adding the first potential VH or the second potential VL to these signals, the potentials of the first signal 41 and the second signal 42 input to the receiving circuit 121 may be guaranteed.

Comparative Example

Figure 7:
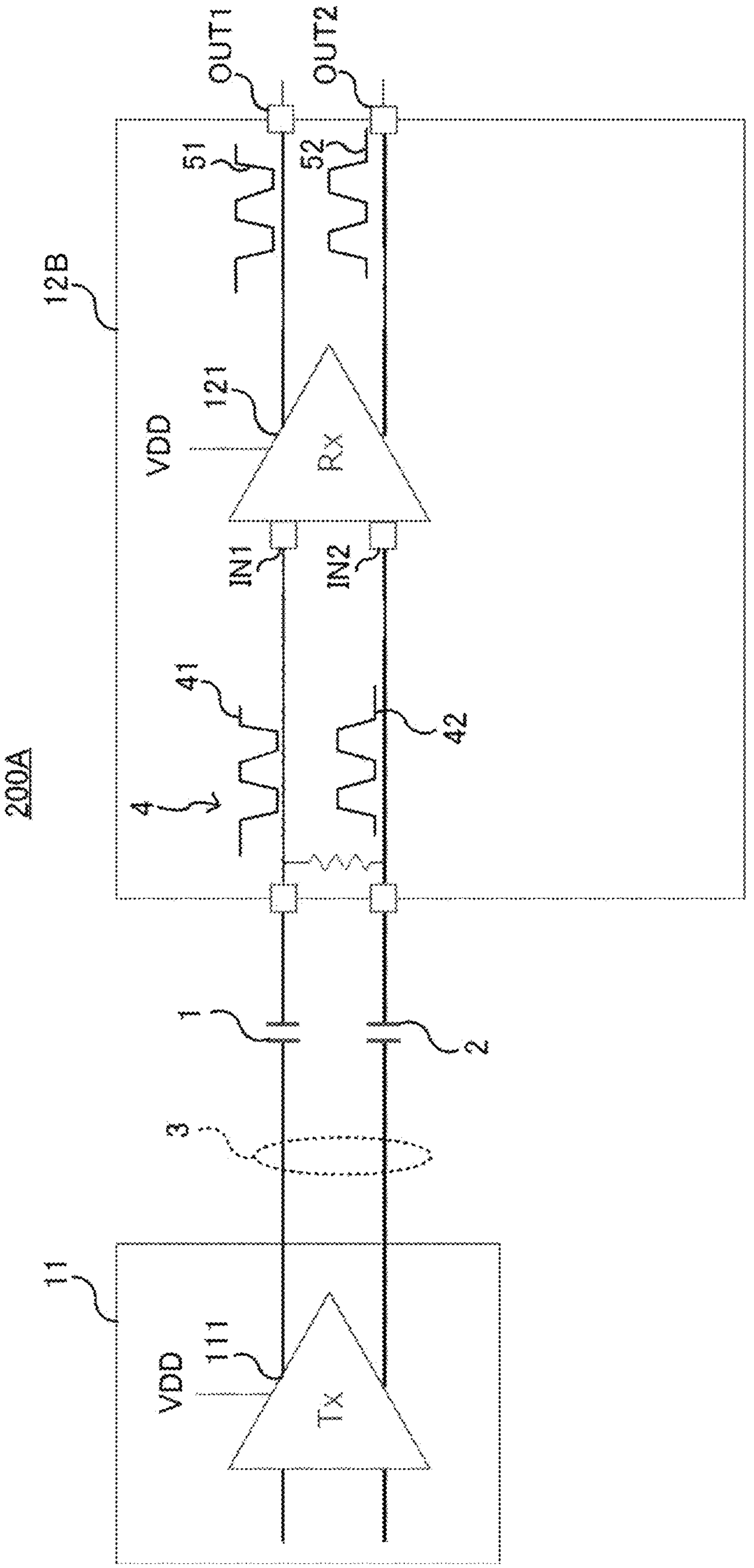
FIG. 7 is a diagram showing the communication system according to the comparative example.

FIG. 7 is a diagram showing the communication system according to the comparative example. The communication system 200A shown in FIG. 7 differs from the communication system 200 shown in FIG. 2 in that a signal output circuit 12B is provided instead of the signal output circuit 12. The signal output circuit 12B does not include the signal supply circuit 122 shown in FIG. 2, but only the receiving circuit 121.

Figure 8:
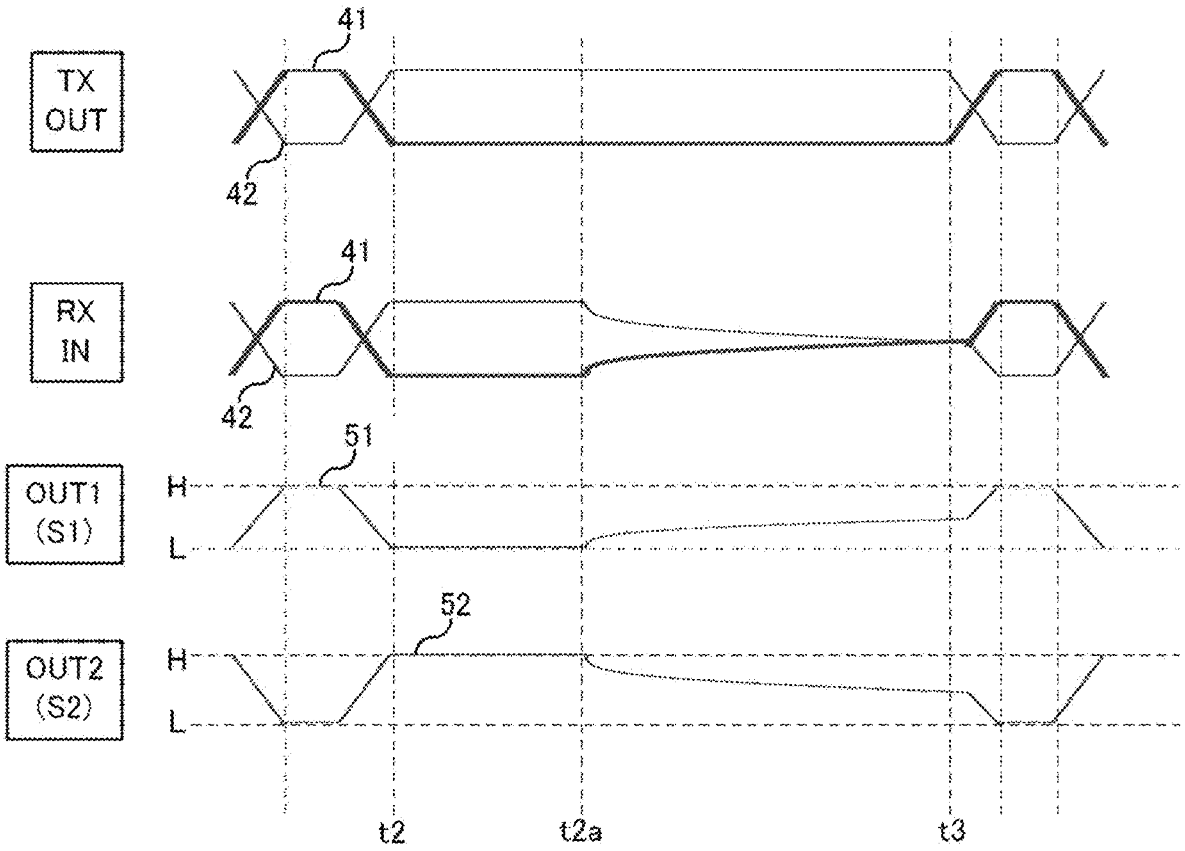
FIG. 8 is a timing chart for illustrating the operation of the circuit according to the comparative example.

FIG. 8 is a timing chart for illustrating the operation of the circuit according to the comparative example. In FIG. 8, the following signals are shown in order from the top.

(1) The voltage levels of the first signal 41 and the second signal 42, which are data output from the transmitting circuit 111.

(2) The voltage levels of the first signal 41 and the second signal 42, which are data input to the receiving circuit 121.

(3) The voltage level of the first logic signal 51, which is the data output from first output terminal OUT1.

(4) The voltage level of second logic signal 52, which is the data output from second output terminal OUT2.

As described above, in the alternating current coupling method, a capacity element is provided in a transmission path for the purpose of removing a direct current signal, so that the capacity element is repeatedly charged and discharged while the data input to the receiving circuit 121 continues to change. In this case, the potentials of the two signals included in the differential signal 4 that change complementarily to each other, that is, the first signal 41 and the second signal 42, change to H level or L level within a certain period of time. Thus, the receiving circuit 121 may operate normally according to the differential signal 4.

In contrast, in the case where the data does not change for a certain period of time, the energy stored in the capacity element continues to be discharged, and the potentials of the first signal 41 and the second signal 42 may decrease to approximately the same level during the period from timing t2*a* to timing t3 in FIG. 8. That is, the first signal 41 and the second signal 42 may be stuck to each other. As a result, the potentials of the first logic signal 51 and the second logic signal 52 of the receiving circuit 121 also drop, making the output of the receiving circuit 121 unstable.

Action and Effect

As shown in FIG. 3, the signal output circuit 12 according to the embodiment of the disclosure includes a signal supply circuit 122, supplying a first guarantee signal 61 having a potential corresponding to a value of the first logic signal 51 to the first input terminal IN1 as a signal for guaranteeing a potential of the first signal 41, and supplying a second guarantee signal 62 having a potential that changes complementarily to the first guarantee signal 61 to the second input terminal IN2 as a signal for guaranteeing a potential of the second signal 42.

With this configuration, even in a situation where the potentials of the first signal 41 and the second signal 42 may decrease since the data from the transmitting circuit 111 does not change for a certain period of time, the potentials of the first signal 41 and the second signal 42 may be guaranteed by the guarantee signal from the signal supply circuit 122. Thus, the potentials of the first logic signal 51 and the second logic signal 52 of the receiving circuit 121 are guaranteed, so that accurate data transfer may be achieved even when data is not transmitted between the transmitting circuit 111 and the receiving circuit 121 for a certain period of time using the alternating current coupling method.

Furthermore, when LVDS is applied to the communication system 200 of the disclosure, the potentials of the first logic signal 51 and the second logic signal 52 are guaranteed, thereby realizing high-speed serial transfer. By realizing high-speed serial transfer, the number of wires between the transmitting circuit 111 and the receiving circuit 121 may be reduced, and the manufacturing costs of the substrate associated with the wires may be reduced. Since LVDS is a differential current mode interface, it has high resistance to external noise and may also reduce crosstalk noise.

It is noted that regarding the embodiment of the disclosure described above, the following Appendix is further disclosed.

Appendix 1

An alternating current coupling circuit, the circuit includes: a receiving circuit, having a first input terminal for inputting a first signal transmitted via a first capacitive element, and a second input terminal for inputting a second signal transmitted via a second capacitive element and having a potential that changes complementarily to the first signal, and outputting a first logic signal corresponding to a potential of the first signal and a second logic signal corresponding to a potential of the second signal; and a signal supply circuit, supplying a first guarantee signal having a potential corresponding to a value of the first logic signal to the first input terminal as a signal for guaranteeing a potential of the first signal, and supplying a second guarantee signal having a potential that changes complementarily to the first guarantee signal to the second input terminal as a signal for guaranteeing a potential of the second signal.

Appendix 2

In the circuit according to Appendix 1, the signal supply circuit is configured to supply the second guarantee signal of a second potential lower than a first potential to the second input terminal when the first guarantee signal of the first potential is supplied to the first input terminal and supply the second guarantee signal of the first potential to the second input terminal when the first guarantee signal of the second potential is supplied to the first input terminal.

Appendix 3

In the circuit according to Appendix 1 or Appendix 2, the signal supply circuit includes a voltage divider circuit that generates the first potential or the second potential by dividing a voltage applied to a resistor provided between two power sources.

Appendix 4

In the circuit according to any one of Appendix 1 to Appendix 3, the signal supply circuit includes: a first switch that is turned on when a value of the first logic signal is a specific potential so as to supply the first guarantee signal of the first potential to the first input terminal; a second switch that is turned on when a value of the second logic signal is a specific potential so as to supply the second guarantee signal of the first potential to the second input terminal; a third switch that is turned on when a value of the second logic signal is a specific potential so as to supply the first guarantee signal of the second potential to the first input terminal; and a fourth switch that is turned on when a value of the first logic signal is a specific potential so as to supply the second guarantee signal of the second potential to the second input terminal.

Appendix 5

A semiconductor device includes the circuit according to any one of Appendix 1 to Appendix 4.

Appendix 6

A communication system includes: a first semiconductor device, having a transmitting circuit for transmitting the first signal and the second signal according to any one of Appendix 1 to Appendix 5; and a second semiconductor device, having the circuit according to any one of Appendix 1 to Appendix 5, wherein the first signal is supplied to the receiving circuit via the first capacitive element, and the second signal is supplied to the receiving circuit via the second capacitive element.

What is claimed is:

1. An alternating current coupling circuit, the circuit comprising:

a receiving circuit, having a first input terminal for inputting a first signal transmitted via a first capacitive element, and a second input terminal for inputting a second signal transmitted via a second capacitive element and having a potential that changes complementarily to the first signal, and outputting a first logic signal corresponding to a potential of the first signal and a second logic signal corresponding to a potential of the second signal; and a signal supply circuit, supplying a first guarantee signal having a potential corresponding to a value of the first logic signal to the first input terminal as a signal for guaranteeing a potential of the first signal, supplying a second guarantee signal having a potential that changes complementarily to the first guarantee signal to the second input terminal as a signal for guaranteeing a potential of the second signal, supplying the second guarantee signal of a second potential lower than a first potential to the second input terminal when the first guarantee signal of the first potential is supplied to the first input terminal, and supplying the second guarantee signal of the first potential to the second input terminal when the first guarantee signal of the second potential is supplied to the first input terminal, wherein the signal supply circuit comprises a voltage divider circuit that generates the first potential or the second potential by dividing a voltage applied to a resistor provided between two power sources.

2. The circuit according to claim 1, wherein the signal supply circuit comprises:

a first switch that is turned on when a value of the first logic signal is a specific potential so as to supply the first guarantee signal of the first potential to the first input terminal;

a second switch that is turned on when a value of the second logic signal is a specific potential so as to supply the second guarantee signal of the first potential to the second input terminal;

a third switch that is turned on when a value of the second logic signal is a specific potential so as to supply the first guarantee signal of the second potential to the first input terminal; and a fourth switch that is turned on when a value of the first logic signal is a specific potential so as to supply the second guarantee signal of the second potential to the second input terminal.

3. The circuit according to claim 1, wherein the receiving circuit includes a differential amplifier circuit receiving the first and second signals.

4. A communication system, comprising:

a first semiconductor device, having a transmitting circuit for transmitting a first signal and a second signal; and a second semiconductor device, having a circuit, the circuit including:

a receiving circuit, having a first input terminal for inputting the first signal transmitted via a first capacitive element, and a second input terminal for inputting the second signal transmitted via a second capacitive element and having a potential that changes complementarily to the first signal, and outputting a first logic signal corresponding to a potential of the first signal and a second logic signal corresponding to a potential of the second signal; and a signal supply circuit, supplying a first guarantee signal having a potential corresponding to a value of the first logic signal to the first input terminal as a signal for guaranteeing a potential of the first signal, supplying a second guarantee signal having a potential that changes complementarily to the first guarantee signal to the second input terminal as a signal for guaranteeing a potential of the second signal, supplying the second guarantee signal of a second potential lower than a first potential to the second input terminal when the first guarantee signal of the first potential is supplied to the first input terminal and supplying the second guarantee signal of the first potential to the second input terminal when the first guarantee signal of the second potential is supplied to the first input terminal, wherein the signal supply circuit comprises a voltage divider circuit that generates the first potential or the second potential by dividing a voltage applied to a resistor provided between two power sources, wherein the first signal is supplied to the circuit via the first capacitive element, and the second signal is supplied to the circuit via the second capacitive element.

5. The communication system according to claim 4 wherein the signal supply circuit comprises:

a first switch that is turned on when a value of the first logic signal is a specific potential so as to supply the first guarantee signal of the first potential to the first input terminal;

a second switch that is turned on when a value of the second logic signal is a specific potential so as to supply the second guarantee signal of the first potential to the second input terminal;

a third switch that is turned on when a value of the second logic signal is a specific potential so as to supply the first guarantee signal of the second potential to the first input terminal; and a fourth switch that is turned on when a value of the first logic signal is a specific potential so as to supply the second guarantee signal of the second potential to the second input terminal.

6. The communication system according to claim 4, wherein the receiving circuit includes a differential amplifier circuit receiving the first and second signals.

* * * * *